United States Patent [19]

Nakazawa et al.

[11] Patent Number: 5,126,561
[45] Date of Patent: Jun. 30, 1992

[54] ANGLE DISPLACEMENT DETECTOR FOR OPTICAL IMAGE STABILIZATION DEVICE

[75] Inventors: Isao Nakazawa, Kanagawa; Koichi Washisu, Tokyo, both of Japan

[73] Assignee: Canon Kabushiki Kaisha, Tokyo, Japan

[21] Appl. No.: 637,532

[22] Filed: Jan. 4, 1991

Related U.S. Application Data

[63] Continuation of Ser. No. 546,691, Jul. 2, 1990, abandoned, which is a continuation of Ser. No. 355,330, May 23, 1989, abandoned.

Foreign Application Priority Data

May 24, 1988 [JP] Japan .................... 63-126373
May 24, 1988 [JP] Japan .................... 63-126374
May 24, 1988 [JP] Japan .................... 63-126375

[51] Int. Cl.$^5$ .............................. G01D 5/30
[52] U.S. Cl. .................... 250/230; 250/231.13; 356/148
[58] Field of Search .......... 250/231.12, 231.13, 250/231.14, 231.17, 230; 356/149, 148; 359/557

[56] References Cited

U.S. PATENT DOCUMENTS

| | | | |
|---|---|---|---|
| 3,892,467 | 7/1975 | Shin | 359/557 |
| 4,315,610 | 2/1982 | Maleug | 356/149 |
| 4,610,172 | 9/1986 | Mickle et al. | 250/231.12 |

*Primary Examiner*—David C. Nelms
*Assistant Examiner*—Que T. Le
*Attorney, Agent, or Firm*—Fitzpatrick, Cella, Harper & Scinto

[57] ABSTRACT

In an angle displacement detector for an optical image stabilization device including a tubular casing which has a chamber containing a sealed-in liquid, a floating body which is disposed within the sealed-in liquid and which is carried in such a way as to be freely rotatable around a given axis of rotation and a detector for detecting a rotation of a floating body around the rotation axis relative to the tubular casing, magnetic elements arranged to have the floating body in a position to permit a measuring action to be adequately carried out at the time of measuring an angle displacement and to adequately keep the floating body in its initial position by a magnetic action when no angle displacement measuring action is required.

78 Claims, 9 Drawing Sheets

ANGLE DISPLACEMENT DETECTOR FOR OPTICAL IMAGE STABILIZATION DEVICE

This application is a continuation of application Ser. No. 07/546,691, filed Jul. 2, 1990, now abandoned, which is a continuation application of Ser. No. 07/355,330, filed May 23, 1989, abandoned.

BACKGROUND OF THE INVENTION

1. Field of the Invention

This invention relates to a device for detecting an angle displacement by utilizing the force of inertia.

2. Description of the Related Art

The operating principle of the device of the above-stated kind is described below with reference to FIGS. 2 and 3 which show an embodiment of this invention and also to FIG. 15 which shows the fundamental arrangement of an angle displacement detector:

A base 1 is arranged to have various component parts mounted thereon. A tubular casing 2 has a chamber formed within the casing 2 to have a floating body 3 and a liquid 4 sealed therein. As shown in detail in FIG. 3, the tubular casing 2 is provided with a groove part 2a which is formed inside the casing 2 to have a U-shaped floating-body carrier 14 fitted in and secured to the casing 2. The floating-body carrier 14 is arranged to carry the floating body 3 in a state freely rotatable around an axis 3a. A mirror 9 and a mask 10 which covers the mirror 9 and which is provided with a slit 10a are mounted on each of two opposite sides of a center block of the floating body 3. Other opposite sides of the center block have arm parts extending therefrom. The floating body 3 has a magnetic property and has its rotation around the axis 3a and buoyancy within the liquid 4 balanced respectively.

A light emitting element (IRED) 5 is arranged to emit light when energized and is securely mounted on the base 1 by means of a light-emitting-element carrier 7. A light receiving element (PSD) 6 is a photo-electric conversion element which is arranged to vary its output according to the position of light received and is securely mounted on the base 1 by a light-receiving-element carrier 8. These light emitting and receiving elements 5 and 6 form an optical angle-displacement detecting means which transmits light via the mirror 9 mounted on the surface of the center block of the above-mentioned floating body 3. The light-emitting-element carrier 7 is provided with a light guiding part 7a which is arranged to guide the light emitted from the light emitting element 5. To the fore end of the light guiding part 7a is attached a mask 10' which is provided with a slit 10a' in the same manner as the mask 10 which covers the mirror 9 of the above-mentioned floating body 3. The light transmission is effected via the tubular casing 2. Therefore, either the whole of or an applicable part of the tubular casing 2 is arranged to be transparent.

A pair of yokes 19 and 20 are arranged to bring forth a magnetic field acting in such a way as to keep the floating body 3 which has a magnetic property in a given position as shown in FIG. 15. The ends of these yokes are oppositely spaced in the diametral direction of the tubular casing 2 as shown in FIG. 15. Another yoke 21 is interposed in between other ends of the yokes 19 and 20. The yoke 21 is provided with a permanent magnet 22 which is fitted on the yoke 21. A magnetic circuit is formed by the yokes 19, 20 and 21 in conjunction with the floating body 3. The floating body 3 is kept in a posture as shown in FIG. 15 by virtue of a weak magnetic force of the permanent magnet 22.

The floating body 3 is rotatably carried in the following manner: As shown in FIG. 2, a rotation shaft 11 vertically pierces through the center block of the floating body 3. A pivot 12 is press-fitted into each of the upper and lower ends of the rotation shaft 11 with its sharply pointed tip set outward. Meanwhile, the above-mentioned U-shaped floating-body carrier 14 is provided with pivot bearings 13 which are formed in the ends of upper and lower arms in a state of being inwardly opposed to each other. The floating body 3 is carried with the sharp pointed tips of the pivots 12 fitted into these pivot bearings 13 respectively.

An upper lid 15 is attached to the tubular casing 2 to seal the latter in a known manner with a silicon adhesive or the like. A rubber gasket 16 is interposed in between a retainer plate 17 and the upper lid 15 and is fixed in position by means of screws or the like.

With the device arranged in the manner described above, the floating body 3 never has any moment of rotation resulting from the influence of gravity in any posture thereof. Further, to prevent any substantial load on the pivot shaft, the rotation around the axis 3a and the buoyancy in the liquid 4 are arranged to be balanced as mentioned in the foregoing.

In the above-stated arrangement, the inside of the liquid 4 is prevented by inertia from being moved even when the tubular casing 2 rotates around the rotation axis 3a. Therefore, the floating body 3 which is in a floating state never rotates. As a result, the tubular casing 2 and the floating body 3 rotate relative to each other around the rotation axis 3a. This is the operating principle of the device for detecting relative angle displacements. These relative angle displacements are detectable by means of the optical detection means which uses the above-stated light emitting and receiving elements 5 and 6.

In actuality, there arises some flow within the sealed-in liquid 4 due to the influence of the wall surface of the tubular casing 2. The flow then would somewhat act on the floating body 3. However, the adverse effect of this can be minimized by adjusting a distance from the wall surface to the floating body 3, the viscosity of the liquid 4, etc. The device which is arranged in the above stated manner detects an angle displacement as follows:

The light emitted from the light emitting element 5 passes through the light guiding part 7a and is projected onto the floating body 3. The light is then reflected by the mirror 9 to reach the light receiving element 6. Meanwhile, as mentioned in the foregoing, The slits 10a' and 10a of the masks 10' and 10 provided on the fore end of the light guiding part 7a and on the mirror 9 of the floating body 3 cause the light to become approximately parallel light to form an image (of the slit) without any blur on the light receiving element 6.

Since the tubular casing 2 and the light emitting and receiving elements 5 and 6 are fixed to the base 1, they move together with each other. In the event of occurrence of a relative angle displacement between the tubular casing 2 and the floating body 3, the image of the slit on the light receiving element 6 moves to an extent as much as the displacement. As a result, the output of the light receiving element 6, i.e., the photo-electric conversion element, which changes its output according to the position of the light received, becomes proportional to the change in the position of the slit image. The angle displacement of the tubular casing 2 thus can be detected on the basis of the output of the element 6.

With the angle displacement detection device arranged as described above, the floating body 3 is in a state of not receiving any external force. The posture of the floating body 3 thus cannot be controlled. Therefore, under this condition, it would be hardly possible to ensure that the position of the slit image is always within the measuring range of the light receiving element 6 if the device is left in this state. However, the device is provided with the above-stated permanent magnet 22 which causes a weak magnetic field to act on the floating body 3. The action of the magnetic field serves to keep the floating body 3 in a predetermined position as shown in FIG. 15.

In order to enable the angle displacement detector to accurately measure the angle displacement, the floating body 3 must be well balanced around the axis of rotation within the sealed-in liquid 4; and, in addition to that, the floating body 3 also must be well balanced with its buoyancy to impose no substantial load on the bearing parts in the direction of axis of rotation. It is relatively easy to attain the former, i.e., the balance around the rotation axis by selecting the shape of the floating body 3, etc. However, the latter balance, i.e., the balance in the direction of axis of rotation, is dependent upon a relation between the specific gravity of the floating body 3 and that of the liquid 4. Besides, in cases where a magnetic property is imparted to the floating body 3 as in this case, the material used for forming the floating body 3 must be selected from among a limited range of materials and this limitation makes the sealed-in liquid 4 not readily selectable.

In view of this problem, it is conceivable to lessen the apparent specific gravity of the floating body 3 by providing an air chamber within the floating body 3. However, this method not only causes an increase in size of the floating body 3 but also results in an increase in the number of parts for sealing the air chamber part. The increased number of parts then lowers the reliability of the device.

Further, the action of the magnetic field exerts an urging force on the floating body 3. The urging force is exerted in principle to keep the floating body 3 in a given posture or position relative to the tubular casing 2. In other words, it is exerted to have the floating body 3 move in one unified body with the tubular casing 2. Therefore, if the acting force of the magnetic field is too strong, it would move the tubular casing 2 together with the floating body 3 to prevent the relative displacement which is to be used for the angle displacement detection. Whereas, if the acting force of the magnetic field is sufficiently small relative to the inertia of the liquid 4, the device can be arranged to be capable of responding to a relatively low frequency or a relatively slow angle displacement.

The above-stated arrangement to fix the position of the floating body 3 with the above-stated weak acting force of the magnetic field presents no problem in cases where the object the angle of displacement of which is to be measured by the detector normally remains stationary. However, if the object to be measured is intended to be normally carried around or moved, as in the case of a photographic camera, binoculars, or the like, the device is constantly subjected to vibrations. Under such a condition, some irregular flow arises in the sealed-in liquid 4. Then, if the measuring action of the device begins with the sealed-in liquid 4 still having the irregular flow, the output of the light receiving element 6 would vary because of the irregular flow while the object being measured is not actually moving. Under such a condition, therefore, it is hardly possible to make accurate measurement. Besides, in an extreme case, the slit image would be moved to the outside of the measurable range of the light receiving element 6. Under such a condition, therefore, the device must be kept still until the irregular flow of the liquid 4 disappears. In this instance, the small urging force of the weak magnetic field action on the floating body 3 requires a long period of time before the floating body 3 settles down.

Apart from the method of using the weak magnetic field action of the permanent magnet, it is conceivable to use an electromagnet. For example, a current is allowed to flow in a larger quantity to quickly set the floating body 3 in the given position and then the current is lessened to give the small urging force before the start of a measuring action. However, this method increases electric energy consumption to an excessive degree for practicable device as the limited electric energy would be consumed with the current allowed to flow when the device is not actually in use.

SUMMARY OF THE INVENTION

It is a first object of this invention to provide a compact and accurate angle displacement detector in which a floating body having a magnetic property can be formed in a relatively small size and to have a small apparent specific gravity.

To attain this object, an angle displacement detector comprising a liquid sealing-in container having a liquid sealing-in chamber in which a liquid is sealed; a floating body which has a magnetic property and which is carried within the sealed-in liquid to be freely rotatable around a given rotation axis; magnetic position-fixing means for fixing the floating body to a given position by exerting a magnetic field action on the floating body from the outside of the liquid sealing-in container; and angle displacement detecting means for detecting a rotation of the floating body relative to the liquid sealing-in container, for example, in an optical manner, is arranged according to this invention in the following manner: The floating body is formed with a plastic material containing a magnetic material which is disposed on a surface or the inside of the plastic material in a layer or in a dispersed state.

The plastic material to be employed as the structural material for the floating body is preferably selected from among materials of small specific gravity such as PC, ABS, etc. Further, in forming a magnetic material layer on a surface of the plastic material, the surface may be, for example, plated with a magnetic material or coated with a coating material containing a magnetic powder. In forming the magnetic layer inside the floating material, a magnetic metal foil may be, for example, buried in the plastic material. Further, the object of the invention is also attainable by dispersing a magnetic powder within the plastic material.

In accordance with the above-mentioned arrangement of the invention, the floating body can be arranged to have a small apparent specific gravity with a magnetic property imparted thereto as desired.

It is a second object of the invention to provide an angle displacement detector wherein a floating body can be stably kept in a normal position when the detector is not performing a measuring action, so that an angle displacement of the floating body can be readily brought about by inertia relative to a tubular casing of the detector.

It is a third object of the invention to provide an angle displacement detector which is capable of promptly beginning a measuring action at a desired measurement start point even in cases where the object to be measured is of the kind to be frequently moved or carried.

It is a fourth object of the invention to provide an angle displacement detector which does not consume much electric energy and is suited for an apparatus of the kind requiring a minimal electric energy consumption like in the case of a camera.

To attain the above-stated second to fourth objects, an angle displacement detector comprising a tubular casing having a chamber in which a liquid is sealed; a floating body disposed within the sealed-in liquid and arranged to be freely rotatable around a given rotation axis; and detecting means for detecting, for example, in an optical manner a rotation of the floating body relative to the tubular casing around the rotation axis is arranged in the following manner: A magnetic property is imparted to the floating body; and the tubular casing is provided with a permanent magnet which is arranged to perform a magnetic field action on the floating body in such a way as to keep the floating body in a given position and an electromagnet device which is arranged to negate the magnetic field action of the permanent magnet on the floating body, the permanent magnet and the electromagnet device being arranged in a fixed relation to the tubular casing.

In the arrangement of the angle displacement detector described above, the floating body is prepared by burying, for example, a magnetic material such as iron or a ferroalloy in a plastic material or may be formed with a plastic material having a powdered magnetic material such as ferrite mixed and dispersed therein.

The above-stated fixed relation to the tubular casing of the permanent magnet and the electromagnet device means that these are arranged either directly or indirectly in one unified body.

Further, to attain the second to fourth objects of the invention, another angle displacement detector of the kind comprising a tubular casing having a chamber in which a liquid is sealed; a floating body disposed within the liquid sealed in the tubular casing and arranged to be carried to be freely rotatable around a given rotation axis; and detecting means for detecting, for example, in an optical manner, a rotation of the floating body relative to the tubular casing around the rotation axis is arranged in the following manner: A magnetic property is imparted to the floating body: the tubular casing is provided with yokes which are in a fixed relation to the tubular casing and are arranged to form a magnetic circuit for fixing the floating body in a given position by performing a magnetic field action on the floating body, the yokes being at least partly made of a hard magnetic material, and electromagnet means for magnetizing and demagnetizing the yokes which are made of the hard magnetic material.

In the embodiment which is arranged as described above, the floating body may be formed either with a plastic material having such a magnetic metal as iron or a ferroalloy buried therein or a plastic material having such a magnetic power as powdered ferrite mixed and dispersed therein. As for the hard magnetic material used at least partly for the yokes, the material may be selected from among materials of a small coercive force such as ferrite or from among such metals as iron, cold-rolled steel (SPCC) or the like for facilitating the magnetizing and demagnetizing actions.

The arrangement according to the invention described above enables the angle displacement detector to have a strong magnetic field action for setting the floating body in a predetermined position under a non-measuring condition and to cancel, at the time of measurement, the strong magnetic field action which is rather detrimental to the angle displacement measuring operation.

Other objects and features of the invention will become apparent from the following detailed description of embodiments thereof taken in conjunction with the accompanying drawings:

DETAILED DESCRIPTION OF THE PREFERRED EMBODIMENTS

Figure 1:
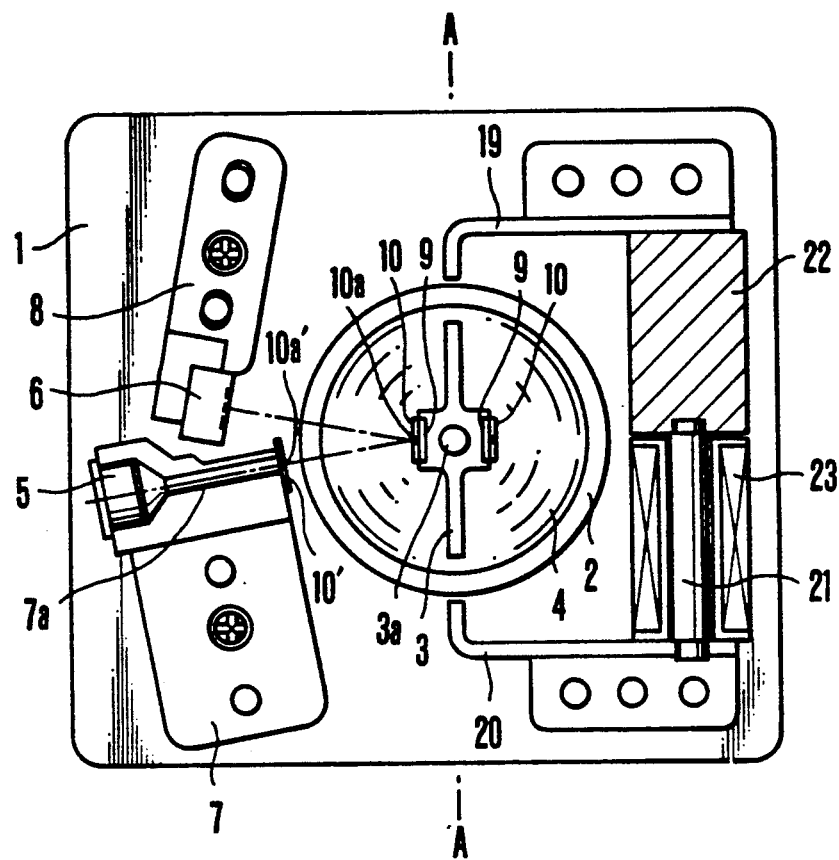
FIG. 1 is a plan view showing in outline the arrangement of an angle displacement detector arranged as an embodiment of the invention.

In the following description of embodiments of this invention, the same members as those shown in FIGS. 2, 3 and 15 which have been referred to in the foregoing are indicated by the same reference numerals:

EMBODIMENT 1

In this embodiment, the following magnetic circuit arrangement is added to the arrangement described in the foregoing: Referring to FIG. 1, yokes 19 and 20 are arranged to form a magnetic circuit. The ends of these yokes on one side of them are opposed to each other across a floating body 3. A permanent magnet 22 and an electromagnet device which is formed by winding an electromagnetic coil 23 around another yoke 21 are disposed in series between other ends of the yokes 19 and 20. These members jointly form a closed magnetic circuit, "the electromagnet device—the permanent magnet 22—the yoke 19—the floating body 3—the yoke 20—the electromagnet device".

When the electromagnetic coil 23 of the electromagnet device is not excited, a magnetic flux which is produced by the permanent magnet 22 flows through the magnetic circuit. With the magnetic flux set at a sufficiently large value, the floating body 3 can be stably kept in the posture and position as shown in FIG. 1. Therefore, the floating body 3 is kept in its normal position by the action of a strong magnetic field formed by the permanent magnet 22 against an external force of vibrations or the like. Therefore, an irregular flow of the sealed-in liquid 4 can be blocked by the floating body 3. Compared with a detector having no magnetic field or merely a weak magnetic field, the embodiment has a much stabler state. Even in the event of occurrence of vibrations or the like, the stable state is restorable in a brief period of time. It is an additional advantage of the detector that, in such a case, the stable state is restorable without any electric energy consumption.

Meanwhile, it is possible to offset the magnetic flux flow of the magnetic circuit by supplying a current to the electromagnetic coil 23 in such a way as to generate another magnetic flux which is of about the same intensity and is in the direction opposite to that of the magnetic flux produced by the permanent magnet 22. This arrangement keeps the floating body 3 which is within the sealed-in liquid 4 in a state of being capable of bringing forth an angle displacement relative to the tubular casing 2 depending upon the inertia of the sealed-in liquid 4. In other words, the floating body 3 can be kept in a state suited for angle displacement detection.

Figure 4:
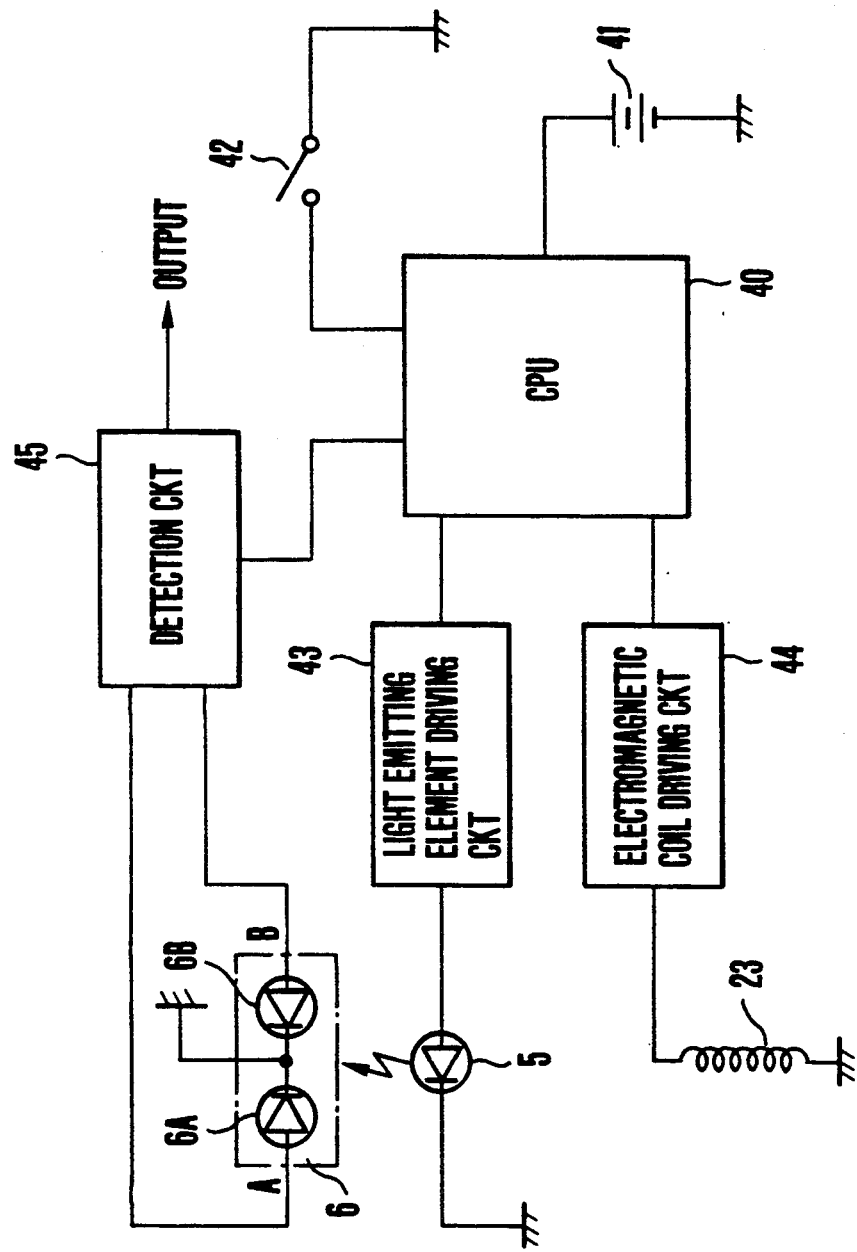
FIG. 4 is a block diagram showing the control circuit of the detector of FIG. 1.
Figure 5:
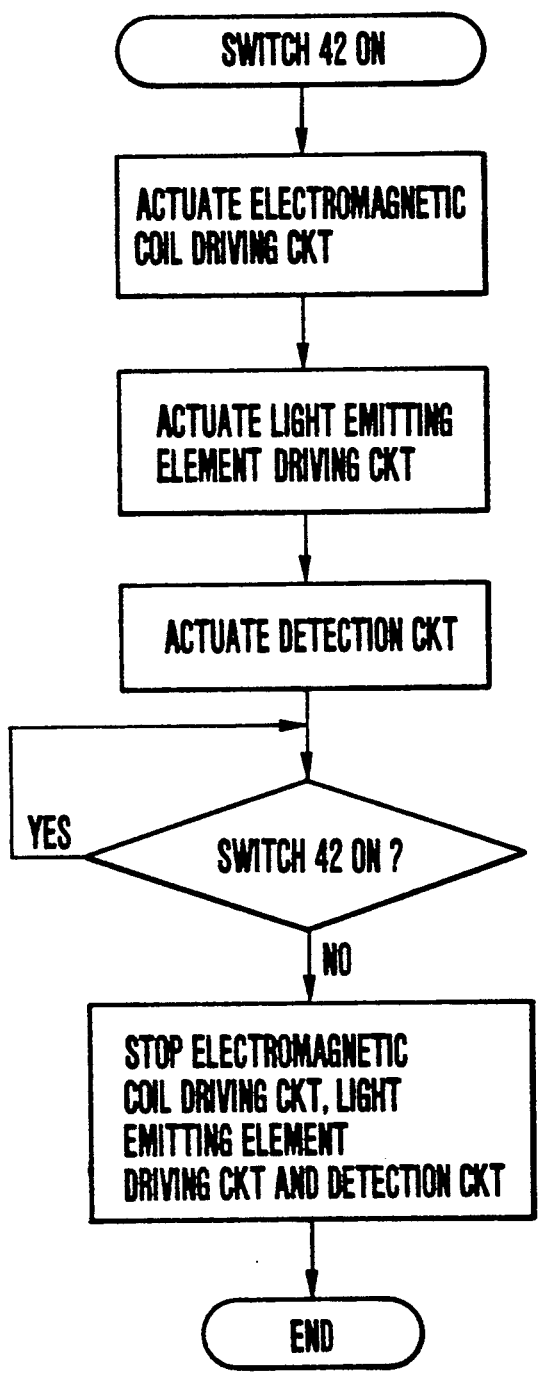
FIG. 5 is a flow chart showing the operation of the control circuit shown in FIG. 4.

FIG. 4 shows a control circuit which is arranged to be used for change-over between exciting and not exciting the electromagnetic coil 23 and for a measuring operation. FIG. 5 is a flow chart showing procedures set for the measuring operation.

In measuring an angle displacement, a switch 42 shown in FIG. 4 is first closed. With the switch 42 closed, a central computing circuit (CPU) 40 of the control circuit actuates an electromagnetic coil driving circuit 44. A current is supplied to the electromagnetic coil 23. Then, this offsets the magnetic flux which is produced by the permanent magnet 22 and which has been acting on the floating body 3 as mentioned in the foregoing. As a result, the floating body 3 assumes a floating state which is dependent on the inertia of the sealed-in liquid 4. The embodiment thus becomes ready for beginning the measuring action. The magnetic flux which is formed by the electromagnetic coil 23 is arranged to be a little weaker than the magnetic flux formed by the permanent magnet 22 and is in the direction opposite to the direction of the latter. Such being the arrangement, the magnetic flux formed by the permanent magnet 22 is offset by the magnetic flux formed by the electromagnetic coil 23, leaving some amount of magnetic field which corresponds to a difference between the magnetic flux of the permanent magnet 22 and that of the electromagnetic coil 23. This remaining amount is suitably adjustable by adjusting the current supply to the electromagnetic coil 23.

The CPU 40 actuates a light emitting element driving circuit 43 to cause a light emitting element 5 to emit light. At the same time, the CPU 40 actuates a detection circuit 45 to perform a predetermined measuring action by receiving the output signal of a light receiving element 6. To obtain information on a change of the output resulting from a shift of the slit image position on the light receiving element 6, a known method is usable. For example, in the case of this embodiment, the light receiving element 6 consists of a pair of elements 6A and 6B. The outputs A and B of these elements 6A and 6B are supplied to the detection circuit 45 to be subjected to a computing operation, "$(A-B)/(A+B)$". With the computing operation performed in this manner, an output can be obtained in proportion to the change of the position of the slit image. The output thus obtained is supplied to an applicable information processing circuit which is not shown.

The operation described above continues until the switch 42 opens. When the switch 42 opens, the actions of the electromagnetic coil driving circuit 44, the light emitting element driving circuit 43 and the detection circuit 45 are brought to a stop and the measuring action comes to an end. Then, the magnetic flux formed by the permanent magnet 22 again comes to flow to the magnetic circuit and the magnetic field comes to act to keep the floating body 3 in its normal position.

EMBODIMENT 2

Figure 6:
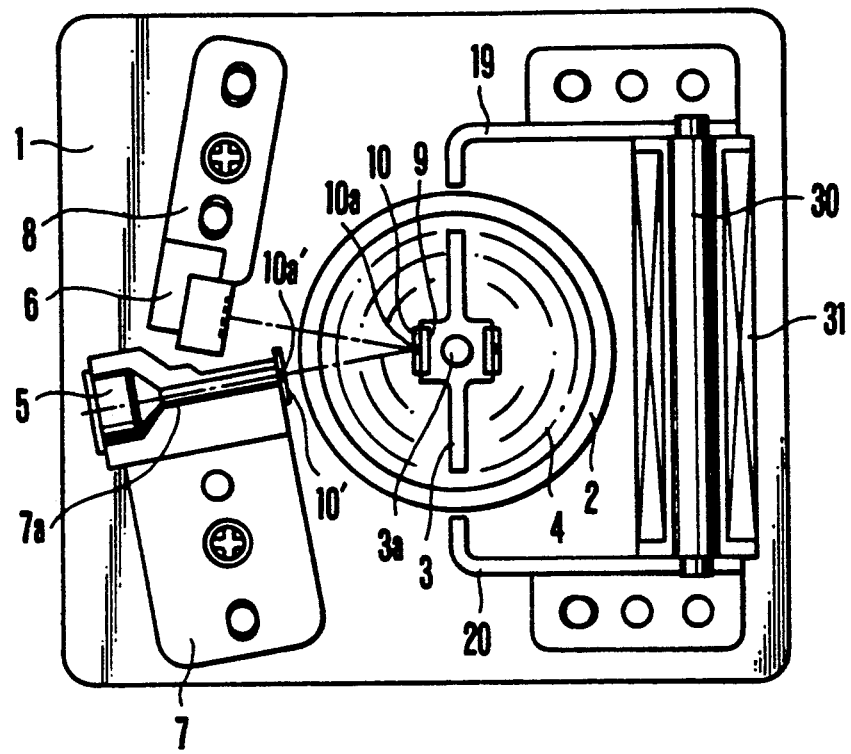
FIG. 6 is a plan view showing in outline the arrangement of an angle displacement detector which is arranged as another embodiment of the invention.

FIG. 6 shows another embodiment of this invention. In this case, an electromagnet device is formed by winding an electromagnetic coil 31 around a permanent magnet 30 by using the latter as an iron core. The rest of the arrangement are similar to the arrangement of the embodiment 1 described in the foregoing. Therefore, in FIG. 6 the same parts as those of the embodiment 1 are indicated by the same reference numerals and they are omitted from the following description:

In the case of the embodiment 2, the permanent magnet 30 and the electromagnetic coil 31 are arranged in parallel to each other. Parts of yokes which form a magnetic circuit are arranged to be permanent magnets. However, this arrangement gives about the same advantageous effect as the embodiment 1.

EMBODIMENT 3

Figure 2:
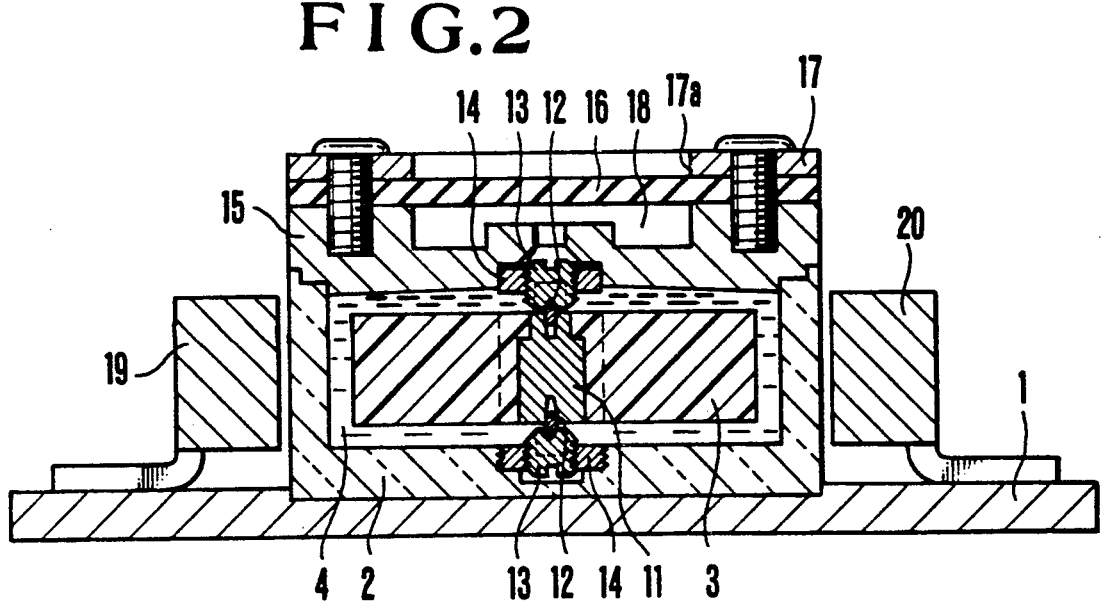
FIG. 2 is a sectional view taken on line A—A of FIG. 1.
Figure 3:
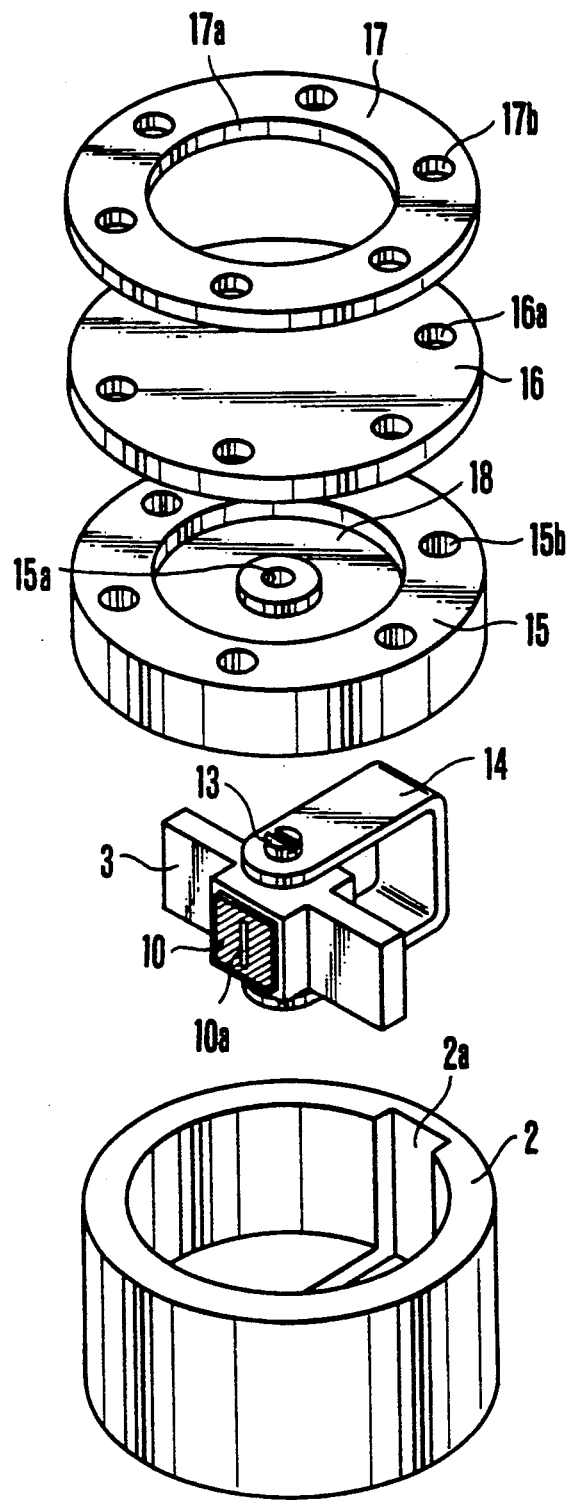
FIG. 3 is an exploded view showing the component parts of a tubular casing arranged to have a liquid sealed therein.
Figure 7:
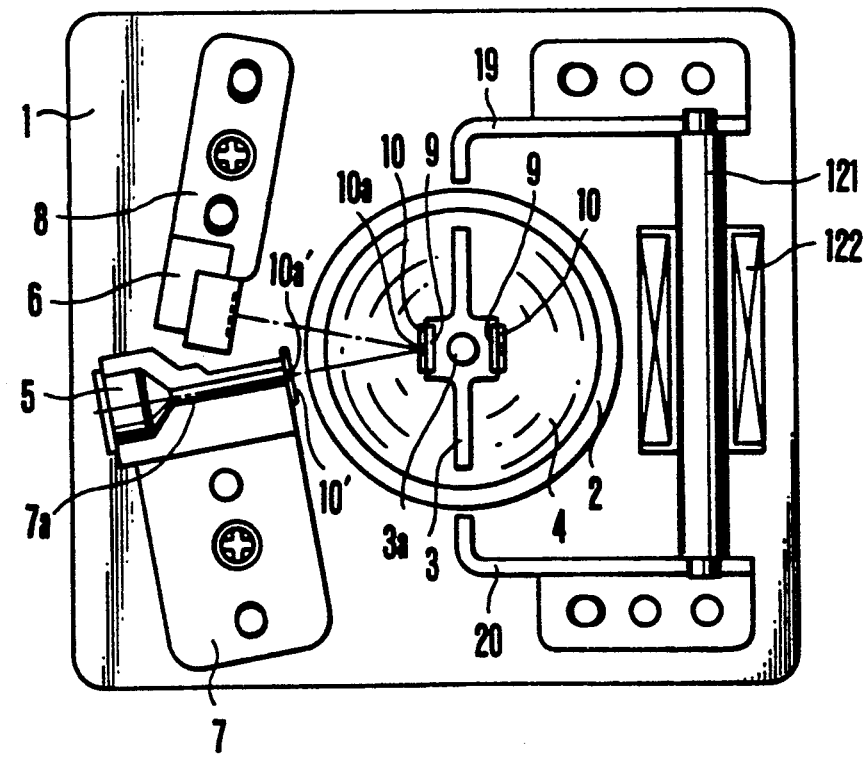
FIG. 7 is a plan view showing in outline the arrangement of an angle displacement detector which is arranged as a further embodiment of the invention.
Figure 15:
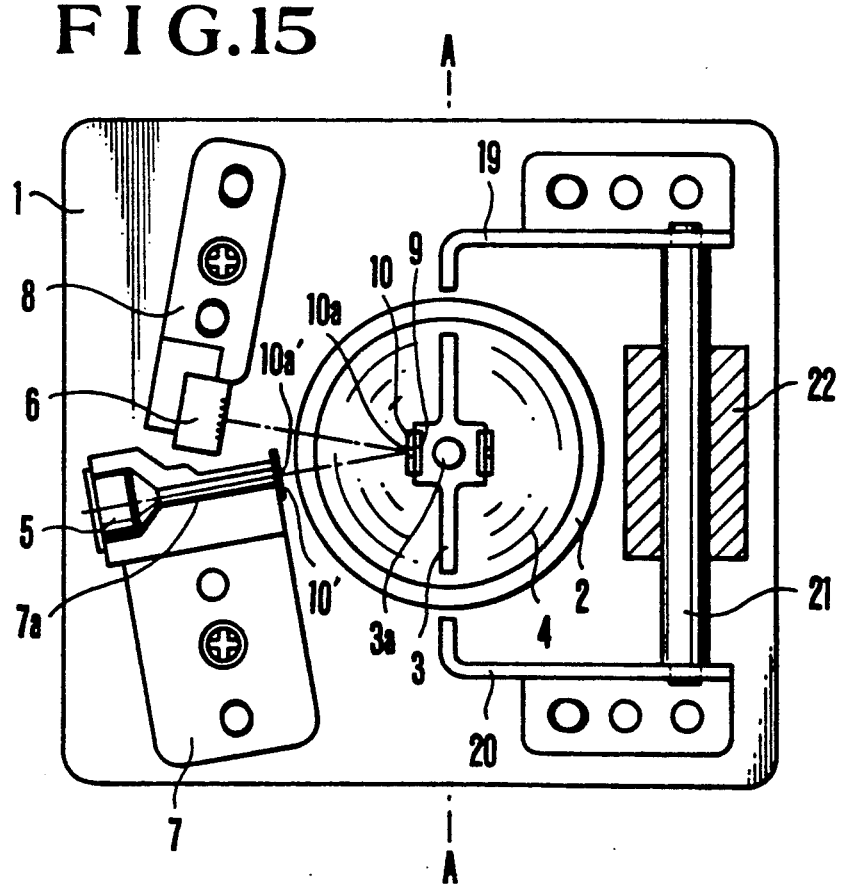
FIG. 15 is a plan view showing the fundamental arrangement of an angle displacement detector for illustrating the operating principle thereof.

In addition to the arrangement described in the foregoing with reference to FIGS. 2, 3 and 15, an embodiment 3 of the invention has the following arrangement for the magnetic circuit: FIG. 7 shows the arrangement of the embodiment 3. Referring to FIG. 7, a pair of yokes 19 and 20 have their ends on one side opposed to each other across a floating body 3. An electromagnetic device which is formed by winding an electromagnetic coil 122 around a yoke 121 is interposed in between other ends of the yokes 19 and 20 on the other side of them. These parts jointly form a closed magnetic circuit, "the yoke 121 of the electromagnet device—the yoke 19—the floating body 3—the yoke 20—the yoke 121 of the electromagnet device". The yoke 121 which serves as the iron core of the electromagnet device is made of a hard magnetic material and is arranged to be magnetized and demagnetized by a current supply to the electromagnetic coil 122.

When the yoke 121 is magnetized by exciting the coil 122 of the electromagnet device, a magnetic flux obtained by the magnetization flows to the above-stated magnetic circuit. The floating body 3 is arranged to be stably kept in its normal position as shown in FIG. 7 with this magnetic flux set at a sufficiently large value. Therefore, the floating body 3 is kept in its normal position by a strong action of a magnetic field formed by the yoke 121 even when an external force of vibrations or the like acts on the embodiment. Any irregular flow of the sealed-in liquid 4 that takes place due to the external force can be stabilized by this. Compared with a case where there is no magnetic field or merely a weak magnetic field, the arrangement of the embodiment brings about by far a stabler normal state. Further, the floating body 3 can be quickly brought back to its normal position in the event of vibrations or the like. Besides, this action requires no electric energy consumption except for the magnetization of the yoke 121.

Meanwhile, the yoke 121 can be demagnetized by negating the magnetic flux flowing to the magnetic circuit with another magnetic flux generated for cancellation of the magnetic flux of the magnetized yoke 121. With the yoke 121 demagnetized in this manner, the floating body 3 which is within the liquid 4 sealed in the tubular casing 2 is set into a state of being capable of showing an angle displacement relative to the tubular casing 2 depending upon the inertia of the sealed-in liquid 4.

Figure 8:
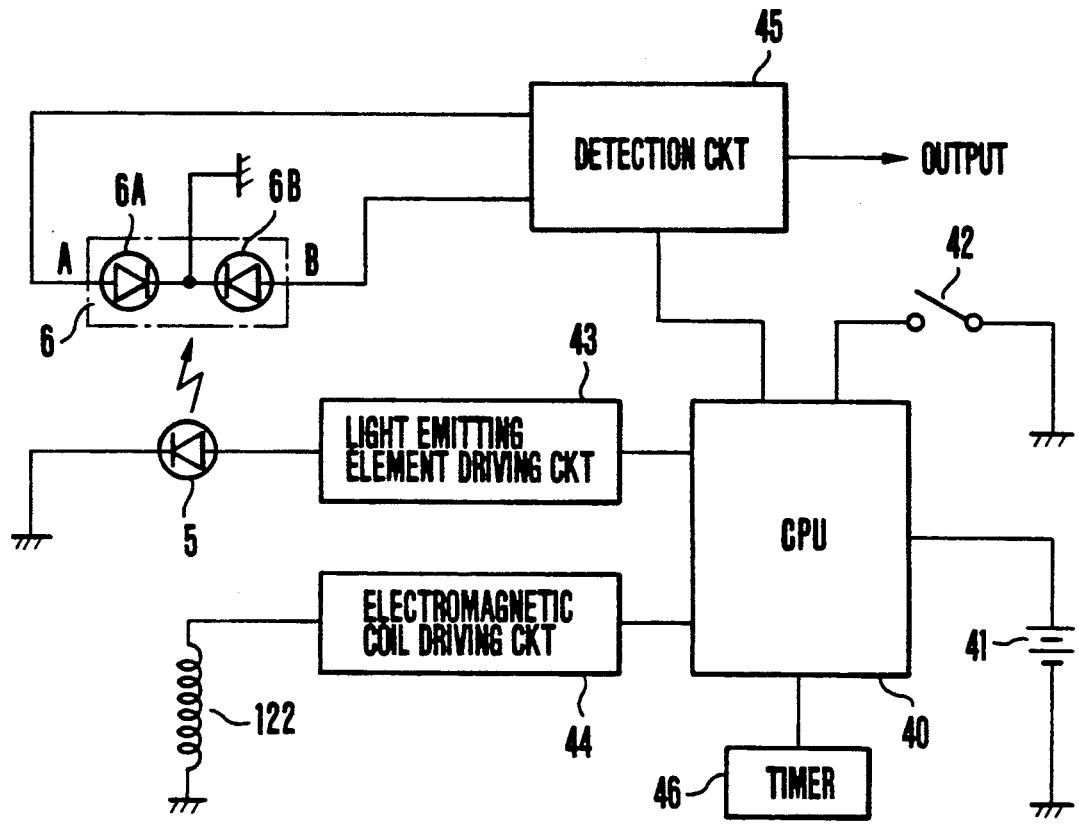
FIG. 8 is a block diagram showing the control circuit of the detector shown in FIG. 7.
Figure 9:
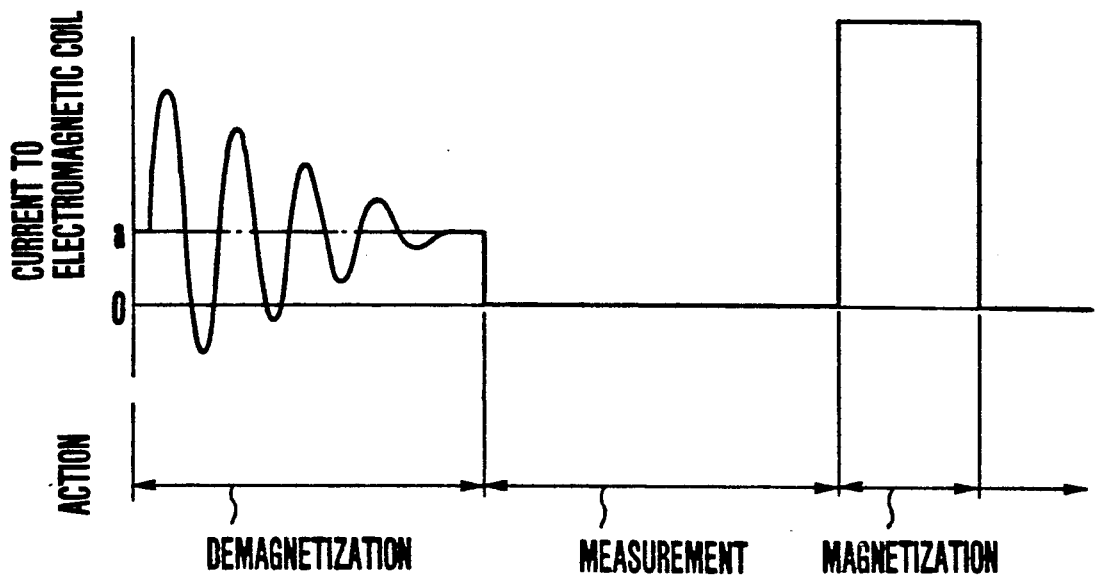
FIG. 9 shows a current supply to the electromagnetic coil as in relation to magnetization and demagnetization.
Figure 10:
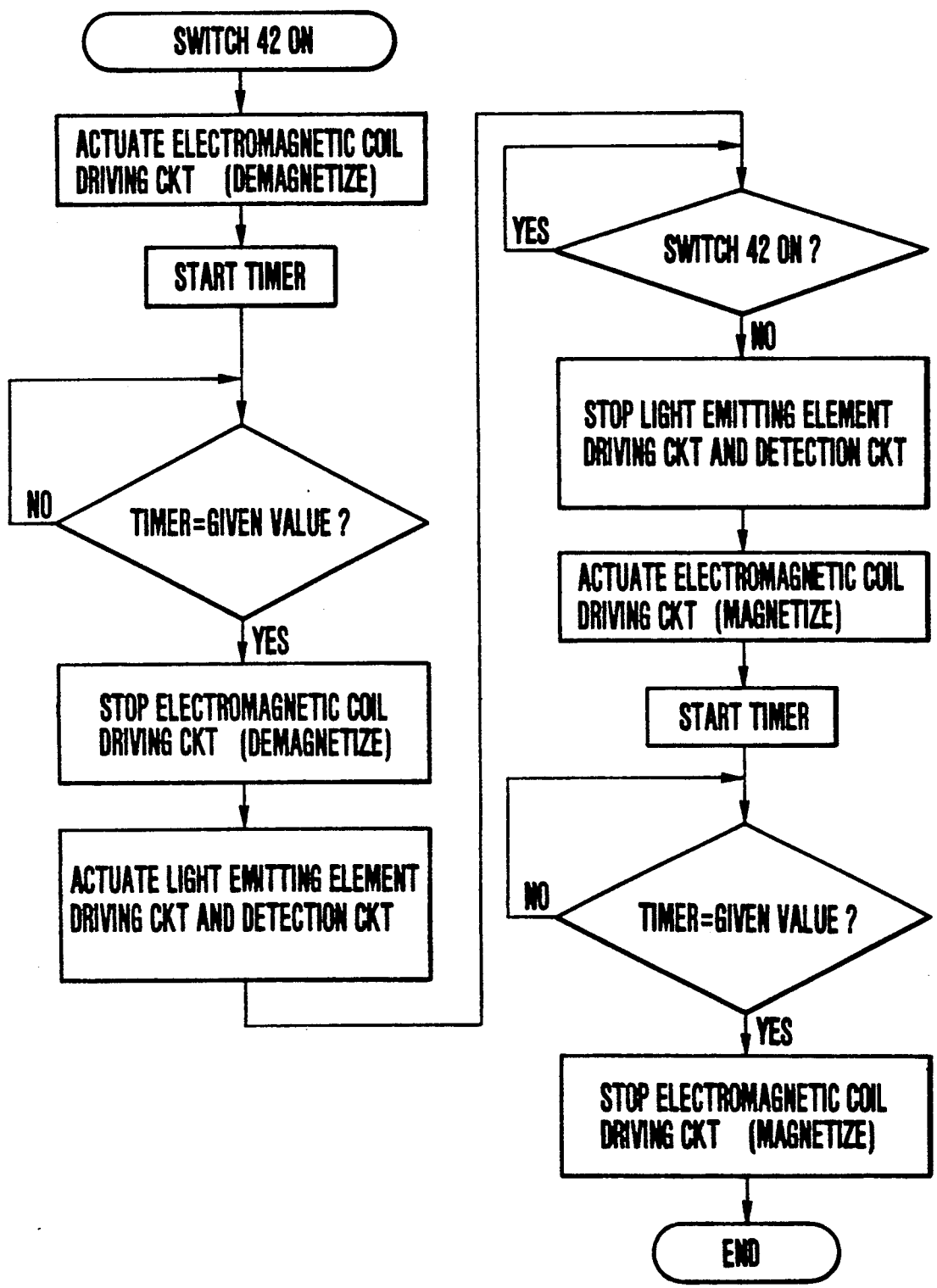
FIG. 10 is a flow chart showing the operation of the control circuit of FIG. 8.

FIG. 8 shows a control circuit provided for control over a current supply to the electromagnetic coil 122 and for a measuring operation. FIG. 9 shows the magnetization and demagnetization of the yoke 121 in relation to the current supply. FIG. 10 is a flow chart showing procedures for the measuring operation.

In measuring an angle displacement, the measuring operation begins by closing a switch 42 of FIG. 8 with the yoke 121 assumed to be in the magnetized state.

With the switch 42 closed, the central computing circuit (CPU) 40 of the control circuit causes an electromagnetic coil driving circuit 44 to operate. In the case of this embodiment, a current of a sinusoidal wave form which converges to a given value "a" as shown in FIG. 9 is supplied to the electromagnetic coil 122 for the purpose of demagnetizing the yoke 121. This demagnetizing action continues for a given period of time as counted by a timer 46. After this, the current supply to the electromagnetic coil 122 comes to a stop. The magnetic flux of the yoke 121 which has been acting on the floating body 3 is canceled by this to bring the floating body 3 into a floating state which is dependent on the inertia of the sealed-in liquid 4 as mentioned above. The embodiment thus becomes ready for commencement of the measuring operation. In the case of this embodiment, the yoke 121 is arranged to have some weak remnant magnetic field action under this demagnetized condition. The degree of the remnant magnetic field action is adjustable to a suitable value through the current supply to the coil 122.

Next, the CPU 40 causes a light emitting element driving circuit 43 to have light emitted from a light emitting element 5 and at the same time causes a detection circuit 45 to operate. The detection circuit 45 performs a predetermined measuring action upon receipt of a signal output from a light receiving element 6.

In order to obtain information on a change taking place in the output of the light receiving element 6 as a result of a change occurred in the position of a slit image obtained on the light receiving element 6, a known method can be used for this purpose. For example, in the case of this embodiment, the light receiving element 6 consists of a pair of elements 6A and 6B which give outputs A and B. These outputs A and B are computed by the detection circuit 45 according to a formula of "$(A-B)/(A+B)$". As a result of this computing operation, the embodiment produces an output which is proportional to the change occurring in the position of the slit image. The output thus obtained is supplied to an applicable information processing circuit which is not shown.

The operation described above continues until the switch 42 is opened. At the point of time when the switch 42 is opened, the CPU 40 brings the measuring operation to an end by stopping the light emitting element driving circuit 43 and the detection circuit 45.

Next, the CPU 40 produces an operation starting instruction to an electromagnetic coil driving circuit 44. In response to this, a high magnetizing current which is as shown in FIG. 9 is supplied to the electromagnetic coil 22 for a given period of time set by the timer 46. By this, the yoke 121 is strongly magnetized. After the lapse of the given period of time, the electromagnetic coil driving circuit 44 stops operating. The yoke 121 which is thus strongly magnetized comes to perform a magnetic field action which is strong enough to bring forth a large urging force to keep the floating body 3 in its normal position. Therefore, the floating body 3 can be kept by the action of the strong magnetic field formed by the yoke 121 in its predetermined normal position even when an external force resulting from vibrations or the like is exerted. Any irregular flow that might be brought about in the sealed-in liquid 4, therefore, can be blocked by the floating body 3. The normal state thus can be quickly and by far more stably obtained than in the case of having either no magnetic field or only a weak magnetic field. Besides, this advantageous effect is attainable with lower electric energy consumption.

EMBODIMENTS 4 and 5

Figure 11:
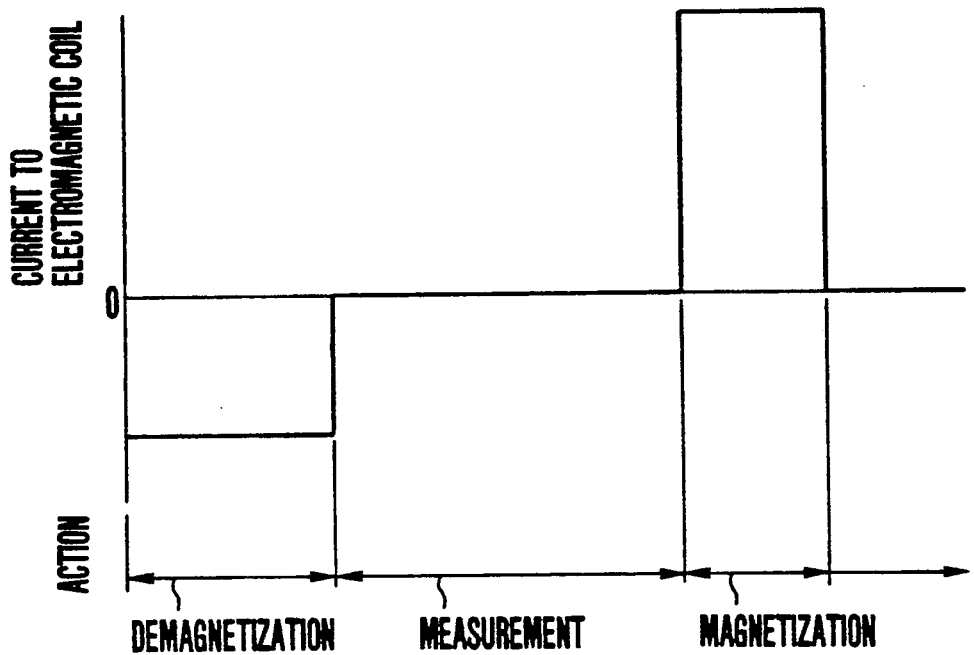
FIGS. 11 and 12 show the relation of a current supply to the electromagnet of the detector shown in FIG. 7 to magnetization and demagnetization.
Figure 12:
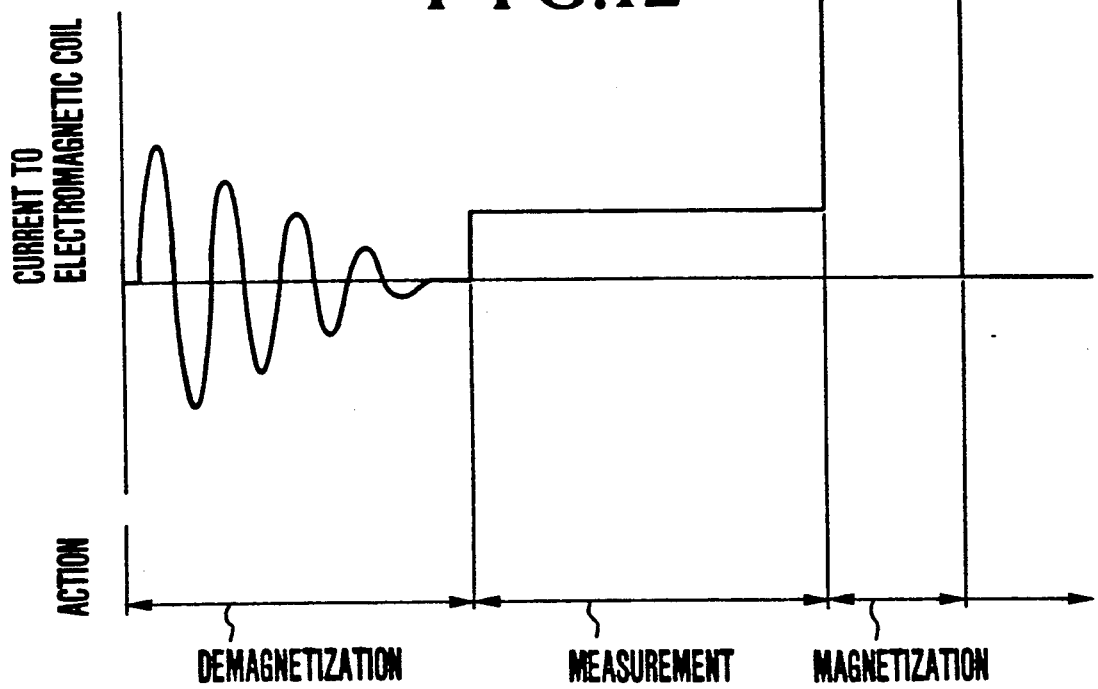

FIGS. 11 and 12 show other embodiments of the invention. In the case of FIG. 11, instead of the above-stated use of the sinusoidal wave for demagnetization, the yoke 121 is arranged to be demagnetized by means of a current supplied to the electromagnetic coil in the direction opposite to the direction in which the yoke is magnetized. This demagnetizing current is set at a smaller value than the magnetizing current, so that a small magnetic field action can be left after demagnetization in the same manner as in the case of other embodiments described. A current value necessary for a desired magnetic force is selectable on the basis of the magnetic hysteresis characteristic of a hard magnetic material used for forming the yoke.

It is an advantage of the embodiment 4 that the arrangement of the electromagnetic coil driving circuit 44 can be simplified as the circuit 44 is not required to produce a sinusoidal wave.

In the case of the embodiment 5 which is shown in FIG. 12, the yoke is demagnetized leaving no remnant magnetic field. After that, a weak magnetic field is formed by allowing a given amount of current to flow to the electromagnetic coil 122 at the time of the measuring operation.

In this case, since the magnetic field is determined by the current allowed to flow to the electromagnetic coil 122, the magnetic field can be obtained in a stable state without being affected by the variations in the properties of the material used for the yoke.

One of these embodiments can be selected according to the movement of the object to be measured.

EMBODIMENT 6

Figure 13:
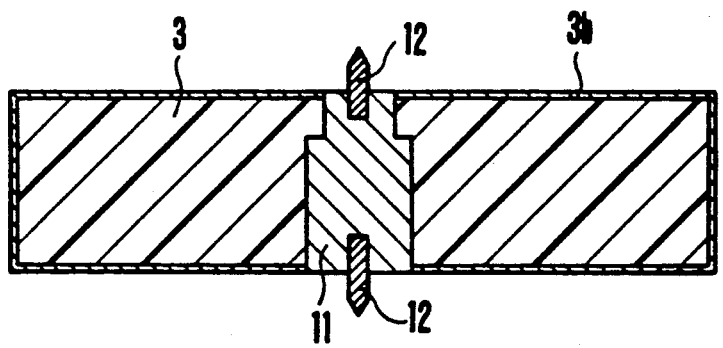
FIG. 13 is a vertical section showing a floating body as a further embodiment of the invention.

In addition to the arrangement described in the foregoing with reference to FIGS. 2, 3 and 15, a feature of an embodiment 6 of the invention resides in that: Referring to FIG. 13, a floating body 3 is formed with a plastic material employed for a structural member. The surface of the floating body 3 is covered with a plated layer 3b which is iron or the like having a magnetic property. The plated layer 3b can be formed in any suitable manner to have a sufficient thickness for forming a magnetic circuit corresponding to the magnetic property required for setting the floating body 3 in a predetermined normal position.

When the floating body 3 is well balanced with the buoyancy of the sealed-in liquid 4, there is no substantial friction between each of pivots 12 of the floating body 3 and each of pivot bearings 13. Therefore, a measuring operation can be carried out without any rotation resistance, moment, etc. that otherwise result form friction. Further, in a case where the measuring object which is associated with the tubular casing 2 happens to rotate around an axis which does not coincide with the rotation axis 3a of the floating body 3, the force of inertia of the floating body 3 is never exerted on the pivot bearing 13 and there arises no moment with the specific gravity of the floating body 3 well balanced with that of the liquid 4. Besides, even in the event of an impact on the measuring object due to falling down of the object or the like, no excessive impact will be inflicted on the bearing part so that the embodiment can be saved from being broken.

Since the floating body 3 is composed of a plastic material of a small specific gravity and a magnetic material as mentioned above, the floating body 3 can be designed to have a sufficiently small apparent specific gravity, so that the floating body 3 can be well balanced with the liquid 4. This permits selection of the liquid 4 from a wide range of liquids with various properties such as viscosity and specific gravity duly taken into consideration.

EMBODIMENT 7

Figure 14:
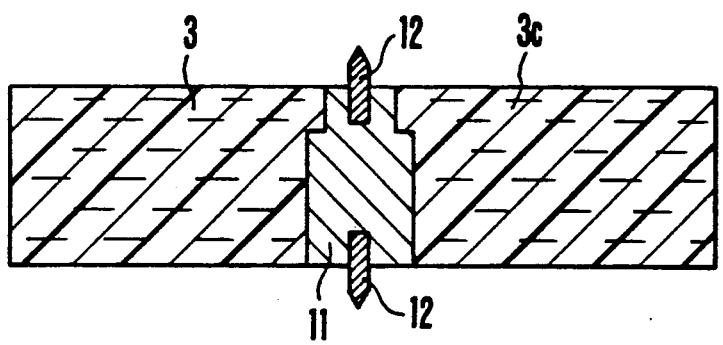
FIG. 14 is a vertical section showing a floating body as a still further embodiment of the invention.

FIG. 14 shows a further embodiment of the invention. In this case, the arrangement of the embodiment shown in FIG. 13 is changed to disperse within a plastic material a powdered metal 3c which has a magnetic property. The amount of the dispersed content of the plastic material can be suitably selected. Therefore, like in the case of the embodiment 6 described above, the floating body 3 can be arranged to have a small apparent specific gravity as well as a magnetic property.

The foregoing description of the embodiments 6 and 7 of course applies also to all other embodiments described with reference to FIGS. 1 to 12 and 15.

Further, each of the embodiments described is arranged to use the optical detection means for detecting the rotation of the floating body relative to the tubular casing. However, the invention is not limited to that arrangement. For example, the angle displacement may be detected using an MR element to detect a reluctance value or by measuring an electrostatic capacity between the yoke and the floating body.

Further, it goes without saying that the invention is applicable not only to the devices adapted for detection of an angle displacement but also to devices adapted for detection of other displacements.

What is claimed is:

1. An angle displacement detector for an optical image stabilization device including a tubular casing having a chamber in which a liquid is sealed, a sensor body disposed within said liquid sealed in said tubular casing and carried to be freely rotatable around a predetermined rotation axis, and detecting means for detecting a rotation of said sensor body relative to said tubular casing around said rotation axis, comprising:

a) permanent magnet means for keeping said sensor body in a predetermined position relative to said tubular casing by a magnetic action when an angle displacement measuring operation is not effected; and
   b) electromagnet means for canceling the magnetic action of said permanent magnet means when the angle displacement measuring operation is effected.

2. A detector according to claim 1, further comprising connection means for integrally connected said permanent magnet means and said electromagnet means.

3. A detector according to claim 2, wherein said connection means is arranged integrally with said tubular casing.

4. A detector according to claim 1, wherein said sensor body is made of a plastic containing a magnetic material in the form of a layer on a surface of said plastic or dispersed on or inside said plastic.

5. An angle displacement detector for an optical image stabilization device including a tubular casing having a chamber in which a liquid is sealed, a sensor body disposed within said liquid sealed in said tubular casing and carried to be freely rotatable around a predetermined rotation axis, and detecting means for detecting a rotation of said sensor body relative to said tubular casing around said rotation axis, comprising:

a) keeping means for keeping said sensor body in a predetermined position relative to said tubular casing by a magnetic keeping action, said holding means including a hard magnetic body; and
   b) control means for controlling magnetization and demagnetization of said hard magnetic body so that said sensor body is kept by the magnetic holding action in said predetermined position when an angle displacement measuring operation is not effected and that the magnetic holding action is canceled when the angle displacement measuring operation is effected.

6. A detector according to claim 5, wherein said control means includes electromagnet means.

7. A detector according to claim 6, further comprising connection means for integrally connecting said keeping means and said electromagnet means.

8. A detector according to claim 7, wherein said connection means is arranged integrally with said tubular casing.

9. A detector according to claim 5, wherein said sensor body is made of a plastic containing a magnetic material in the form of a layer on a surface of said plastic or dispersed on or inside said plastic.

10. An angle displacement detector for an optical image stabilization device including a tubular casing having a chamber in which a liquid is sealed, a sensor body disposed within said liquid sealed in said tubular casing and carried to be freely rotatable around a predetermined rotation axis, and detecting means for detecting a rotation of said sensor body relative to said tubular casing around said rotation axis, comprising:

a) keeping means for keeping said sensor body in a predetermined position relative to said tubular casing by a magnetic action; and b) a synthetic resin material included on a surface of or inside said sensor body, said synthetic resin material containing a magnetic material for receiving the magnetic action of said keeping means.

11. A detector according to claim 10, wherein said magnetic material is in the form of a layer or is dispersed.

12. A relative movement detection device, comprising:

(A) a movable body, (B) keeping means for movably holding said movable body, (C) detecting means for detecting relative movement between said movable body and said keeping means, and (D) control means for controlling drive of said movable body by mutual action of a magnet and an electromagnetic force.

13. A device according to claim 12, wherein said control means includes means for controlling the action of said magnet so as to offset the same by the action of said electromagnetic force.

14. A device according to clam 12, wherein said control means includes means for magnetizing said magnet by said electromagnetic force.

15. A device according to claim 12, wherein said control means includes means for demagnetizing said magnet by said electromagnetic force.

16. A device according to claim 12, wherein said control means includes a yoke on which said magnet and means for generating said electromagnetic force are provided.

17. A device according to claim 12, wherein said control means includes means for changing said electromagnetic force.

18. A device according to claim 17, where in said control means further includes means for changing the direction of said electromagnetic force.

19. A device according to claim 18, wherein said control means further includes means for reversing the direction of said electromagnetic force.

20. A device according to claim 12, wherein said control means includes means for preventing complete offset between the action of said magnet and the action of said electromagnetic force.

21. A device according to claim 12, wherein said detecting means includes means for generating a signal representing a relative displacement between said movable body and said keeping means.

22. A device according to claim 21, wherein said detecting means further includes means for generating a signal representing a relative angular position between said movable body and said keeping means.

23. A device according to claim 12, wherein said detecting means includes optical detection means.

24. A device according to claim 12, wherein said movable body includes a magnetic reacting means.

25. A device according to claim 24, wherein said movable body is constructed with a synthetic resin.

26. A device according to claim 25, wherein said synthetic resin contains magnetic material therein or on its surface.

27. A device according to claim 25, wherein said synthetic resin contains the magnetic material in a layer form or in a dispersed form.

28. A device according to claim 12, wherein said detecting means includes means for generating a signal for detection of shaking.

29. A device according to claim 12, wherein said holding means includes means for rotatable holding said movable body.

30. A device according to claim 12, wherein said control means includes means for moving said movable body to a predetermined position.

31. A device according to claim 12, wherein said control means is fixed relative to said keeping means.

32. A relative movement detection device, comprising (A) seal means for sealing liquid therein, (B) a movable body held in such a manner that it can move with the liquid sealed in said seal means, (C) detection means for detecting a relative movement between said seal means and said movable body, and (D) control means for controlling said movable body by action of a electromagnetic force.

33. A device according to claim 32, wherein said movable body includes means for rotatable holding the movable body.

34. A device according to claim 33, wherein said movable body is balanced in rotation.

35. A device according to claim 32, wherein said movable body is balanced in its holding.

36. A device according to claim 32, wherein said movable body is balanced in its floating force relative to said liquid.

37. A device according to claim 32, wherein said control means includes means for changing said electromagnetic force.

38. A device according to claim 37, wherein said control means further includes means for changing the direction of said electromagnetic force.

39. A device according to claim 38, wherein said control means further includes means for reversing the direction of said electromagnetic force.

40. A device according to claim 32, wherein said detecting means includes means for generating a signal representing a relative displacement between said movable body and said sealing means.

41. A device according to claim 40, wherein said detecting means further includes means for generating a signal representing a relative angular position between said movable body and said sealing means.

42. A device according to claim 32, wherein said detecting means includes optical detection means.

43. A device according to claim 32, wherein said movable body includes a magnetic reacting means.

44. A device according to clam 43, wherein said movable body is constructed with a synthetic resin.

45. A device according to claim 44, wherein said synthetic resin contains magnetic material therein or on its surface.

46. A device according to claim 44, wherein said synthetic resin contains the magnetic material in a layer form or in a dispersed form.

47. A device according to claim 32, wherein said detecting means includes means for generating a signal for detection of shaking.

48. A device according to claim 32, wherein said control means includes means for moving said movable body to a predetermined position.

49. A device according to claim 32, wherein said control means is fixed relative to said sealing means.

50. A relative movement detection device, comprising:
(A) sealing means for sealing liquid therein,
(B) a movable body held movably with said liquid sealed in said sealing means, at least part of said movable body being composed of synthetic resin having a magnetically reactive material on it surface or in its interior,
(C) detection means for detecting relative movement between said sealing means and said movable body, and
(D) control means for controlling said movable body magnetically.

51. A device according to claim 50, wherein said synthetic resin contains the magnetic reactive material in a layer form or in a dispersed form.

52. A device according to claim 50, wherein said movable body includes means for rotatable holding the movable body.

53. A device according to claim 51, wherein said movable body is balanced in rotation.

54. A device according to claim 50, wherein said movable body is balanced in its holding.

55. A device according to claim 50, wherein said movable body is balanced in its floating force relative to said liquid.

56. A device according to claim 50, wherein said control means includes means for changing said magnetic action.

57. A device according to claim 56, wherein said control means further includes means for changing the direction of said magnetic action.

58. A device according to claim 57, wherein said control means further includes means for reversing the direction of said magnetic action.

59. A device according to claim 50, wherein said detecting means includes means for generating a signal representing a relative displacement between said movable body and said sealing means.

60. A device according to claim 59, wherein said detecting means further includes means for generating a signal representing a relative angular position between said movable body and said sealing means.

61. A device according to claim 50, wherein said detecting means includes optical detection means.

62. A device according to claim 50, wherein said detecting means includes means for generating a signal for detection of shaking.

63. A device according to claim 50, wherein said control means includes means for moving said movable body to a predetermined position.

64. A device according to claim 50, wherein said control means is fixed relative to said sealing means.

65. A relative movement detection device, comprising:
(A) a movable body including synthetic resin having magnetically reactive material on its surface or in its interior,
(B) keeping means for movably holding said movable body,
(C) detection means for detecting relative movement between said movable body and said keeping means, and
(D) control means for magnetically controlling said movable body.

66. A device according to claim 65, wherein said synthetic resin contains the magnetic reactive material in a layer form or in a dispersed form.

67. A device according to claim 65, wherein said keeping means includes means for rotatably holding said movable body.

68. A device according to claim 67, wherein said movable body is balanced in its rotation.

69. A device according to claim 65, wherein said movable body is balanced in its holding.

70. A device according to claim 65, wherein said control means includes means for changing said magnetic action.

71. A device according to claim 70, wherein said control means further includes means for changing said direction of said magnetic action.

72. A device according to claim 71, wherein said control means further includes means for reversing the direction of said magnetic action.

73. A device according to claim 65, wherein said detecting means includes means for generating a signal representing a relative displacement between said movable body and said keeping means.

74. A device according to claim 73, wherein said detecting means further includes means for generating a signal representing a relative angular position between said movable body and said keeping means.

75. A device according to claim 65, wherein said detecting means includes optical detection means.

76. A device according to claim 65, wherein said detecting means includes means for generating a signal for detection of shaking.

77. A device according to claim 65, wherein said control means includes means for moving said movable body to a predetermined position.

78. A device according to claim 65, wherein said control means is fixed relative to said keeping means.

* * * * *